US008348748B2

(12) United States Patent
Black

(10) Patent No.: US 8,348,748 B2

(45) Date of Patent: Jan. 8, 2013

(54) BETTING ON GAMES USING A BETTING EXCHANGE SYSTEM

(75) Inventor: Andrew Black, Cobham (GB)

(73) Assignee: The Sporting Exchange, Ltd., London (GB)

(*) Notice: Subject to any disclaimer, the term of this patent is extended or adjusted under 35 U.S.C. 154(b) by 1507 days.

(21) Appl. No.: 11/184,963

(22) Filed: Jul. 20, 2005

(65) Prior Publication Data

US 2007/0021172 A1 Jan. 25, 2007

(51) Int. Cl.
*A63F 13/12* (2006.01)
*G06Q 30/00* (2012.01)
*G06Q 50/00* (2012.01)

(52) U.S. Cl. .................. 463/25; 463/40; 463/42; 705/37

(58) Field of Classification Search .................... 463/13, 463/16, 40, 42; 273/292; 705/37
See application file for complete search history.

(56) References Cited

U.S. PATENT DOCUMENTS 3,593,303 A 7/1971 Streets
3,645,531 A 2/1972 Wright
4,412,287 A 10/1983 Braddock, III
4,903,201 A 2/1990 Wagner
5,077,665 A 12/1991 Silverman et al.
5,136,501 A 8/1992 Silverman et al.
5,390,934 A * 2/1995 Grassa .......................... 273/292
5,542,671 A 8/1996 Stewart
5,573,244 A 11/1996 Mindes
5,573,248 A 11/1996 Parra et al.
5,620,182 A 4/1997 Rossides
5,672,106 A 9/1997 Orford et al.
5,713,793 A 2/1998 Holte
5,743,798 A * 4/1998 Adams et al. ................... 463/17
5,785,596 A 7/1998 Hobert
5,828,843 A 10/1998 Grimm et al.
5,830,069 A 11/1998 Soltesz et al.
5,832,462 A 11/1998 Midorikawa et al.
5,836,816 A 11/1998 Bruin et al.
5,842,921 A 12/1998 Mindes et al.
5,894,556 A 4/1999 Grimm et al.
(Continued)

FOREIGN PATENT DOCUMENTS

AU 199965355 7/2000
(Continued)

OTHER PUBLICATIONS

"Texas Hold'em". Jun. 24, 2004. Wikimedia Foundation. Oct. 12, 2004. <http://en.wikipedia.org/w/index.php?title=Texas_hold_%27em&oldid=4386198>.*

(Continued)

*Primary Examiner* — David L Lewis
*Assistant Examiner* — Werner Garner
(74) *Attorney, Agent, or Firm* — Staas & Halsey LLP

(57) ABSTRACT

Users of a betting exchange system are permitted to bet on poker and other games in which the game has a number of rounds. For a Texas Holdem poker game, each round allows users to submit bets backing and laying one or more hands of cards during a betting window between game transitions, which result in the display to the plurality of users of selected hole or community cards, depending on the round. After each transition, the hands are evaluated to determine if there are any winners or losers and further betting on selected hands may be permitted, or the game may proceed to settlement.

12 Claims, 8 Drawing Sheets

U.S. PATENT DOCUMENTS

| | | | | |
|---|---|---|---|---|
| 5,924,082 | A | 7/1999 | Silverman et al. | |
| 5,924,083 | A | 7/1999 | Silverman et al. | |
| 5,963,923 | A | 10/1999 | Garber | |
| 5,970,479 | A | 10/1999 | Shepherd | |
| 6,007,066 | A * | 12/1999 | Moody | 273/292 |
| 6,033,308 | A | 3/2000 | Orford et al. | |
| 6,104,815 | A | 8/2000 | Alcorn et al. | |
| 6,135,881 | A | 10/2000 | Abbott et al. | |
| 6,287,199 | B1 | 9/2001 | McKeown et al. | |
| 6,358,150 | B1 | 3/2002 | Mir et al. | |
| 6,361,437 | B1 | 3/2002 | Walker et al. | |
| 6,508,710 | B1 | 1/2003 | Paravia et al. | |
| 6,519,574 | B1 | 2/2003 | Wilton | |
| 6,674,448 | B1 | 1/2004 | Garahi et al. | |
| 6,712,701 | B1 | 3/2004 | Boylan et al. | |
| 6,773,347 | B1 | 8/2004 | Marshall et al. | |
| 7,020,632 | B1 | 3/2006 | Kohls et al. | |
| 7,302,412 | B1 | 11/2007 | Speck | |
| 7,690,991 | B2 | 4/2010 | Black | |
| 7,780,169 | B2 * | 8/2010 | Breslo | 273/269 |
| 2002/0068629 | A1 * | 6/2002 | Allen et al. | 463/42 |
| 2002/0147047 | A1 * | 10/2002 | Letovsky et al. | 463/42 |
| 2003/0038425 | A1 * | 2/2003 | Tarantino | 273/274 |
| 2003/0096651 | A1 * | 5/2003 | Black | 463/42 |
| 2004/0248637 | A1 | 12/2004 | Liebenberg et al. | |
| 2005/0085287 | A1 * | 4/2005 | Sines | 463/13 |
| 2005/0197948 | A1 | 9/2005 | Davie et al. | |
| 2005/0282605 | A1 * | 12/2005 | Englman et al. | 463/13 |
| 2007/0054721 | A1 * | 3/2007 | Jackson | 463/13 |
| 2007/0210519 | A1 * | 9/2007 | Barlev | 273/292 |

FOREIGN PATENT DOCUMENTS

| | | |
|---|---|---|
| AU | 200056633 | 1/2001 |
| AU | 2004100599 | 9/2004 |
| GB | 2 180 675 | 4/1987 |
| GB | 2 356 071 | 5/2001 |
| RU | 99/36846 | 7/1999 |
| WO | WO 95/23383 | 8/1995 |
| WO | WO 97/15362 | 10/1996 |
| WO | WO 97/22072 | 6/1997 |
| WO | WO 98/04991 | 2/1998 |
| WO | WO 98/26361 | 6/1998 |
| WO | WO 99/34887 | 7/1999 |

OTHER PUBLICATIONS

Shamir, A., Rivest, R. and Adleman, L., "Mental Poker", in Mathematical Gardner, D.E. Klarner, ed., Wadsworth International, 1981, pp. 37-43.*

"Racing: Betfair Collects Award", by Patrick Weaver, The Express, Apr. 22, 2003.

"They're Off With a Legal Seal of Approval", Mail on Sunday, Jan. 26, 2003.

"Turning the Tables—Bookies on Offensive As Business is Squeezed in Gambling Revolution", Daily Mail, Sep. 3, 2002.

"Revolution—and the Bells Toll for Thee, Mr. Bookmaker", Racing Post, Jul. 24, 2002.

Printout from www.queensawards.org.uk, downloaded Aug. 7, 2007, "The Queen's Award for Enterprise: Innovation 2003".

"Racing: Punters at Odds with Each Other: An Online Betting Revolution Could Spell the End for Traditional Ways of Gambling", The Observer, Jan. 13, 2002.

"Odds on Chance of Coming Out on Top", The Herald (Glasgow), Jan. 28, 2002.

"Online Newcomer Ups the Pace in the Bookmaking Stakes", Evening Standard, Jun. 16, 2003.

"Betting Exchanges Oust the Bookies", Investment Briefing, Jun. 20, 2003.

Colin Cameron, "You Bet the Betfair Story: How Two Men Changed the World of Gambling", 308 pages, HarperCollins Publishers. Copyright 2008.

Robert Forsythe, et al., "Anatomy of an Experimental Political Stock Market, " the American Economic Review, vol. 82, No. 5, (Dec. 1992), pp. 1142-1161.

Evidence in Support Opposition to Patent Application: 785337: Attachment 6—E-Mail from Professor Nelson D. Forrest.

www.betex.com/home.html, printout dated Mar. 30, 2005.

www.betex.com/aboutus/article.htm, printout dated Mar. 30, 2005.

www.betex.com/aboutus/about.htm, printout dated Mar. 30, 2005.

www.betex.com/how.html, printout dated Mar. 30, 2005.

Tom Anderson, "New Person-to-Person Betting Site for 'Flutterers'", http://www.netimperative.com/2000/03/28/New_persontoperson, printout dated Mar. 30, 2005.

Robin Hanson, "Idea Future, How Making Wagers on the Future Can Make it Happen Faster", WIRED, Sep. 1995.

www.wsex.com, printout dated Apr. 28, 2005.

www.wsex.com/main.html, printout dated Apr. 28, 2005.

www.wsex.com/about/wse_rules.html, printout dated Apr. 28, 2005.

www.wsex.com/menu/interactive.html, printout dated Apr. 28, 2005.

www.wsex.com/about/sport_futures.html, printout dated Apr. 28, 2005.

www.wsex.com/about/limit_order.html, printout dated Apr. 28, 2005.

www.wsex.com/about/faq.html, printout dated Apr. 28, 2005.

Rebecca Quick, "Entrepreneurs Roll the Dice on a New Site", The Wall Street Journal, Thursday, Apr. 10, 1997.

Steven Crist, "All Bets Are Off", Sports Illustrated, Jan. 26, 1998.

"Scarne's Complete Guide to Gambling," by John Scarne, 1961, Simon & Schuster, New York, NY, definition of laying a bet, pp. 683 and 684.

"Scarne's Complete Guide to Gambling", by John Scarne, 1961, Simon & Schuster, New York, NY, chapter on craps.

"Scarne's Complete Guide to Gambling", by John Scarne, 1961, Simon & Schuster, New York, NY, chapter on bookmaking.

H.R. 4411, "Internet Gambling Prohibition and Enforcement Act," downloaded from www.govtrack.us/data/us/bills.txt/109/h/h4411.pdf Oct. 8, 2006.

1961 Wire Act, downloaded from www.uscode.house.gov/download/pls/18C50.txt Oct. 8, 2006.

Priority document for British patent application 0008530.8, downloaded from www.wipo.int Oct. 8, 2006.

Wikipedia articles for "Arbitrage," "Arbitrage Betting," "Bet Exchange," "Bookmaker," "Call Option," "Derivative (Finance)," "Hedge Fund," "Matched Betting," "Option," "Put (Option)," "Short (Finance)," and "Spread Betting," downloaded from www.wikipedia.org. Oct. 6, 2006.

UK patent application search report, GB 2 356 071 A, application 0008530.8, Black, published May 9, 2001.

"Trading Trend or Ranger?", www.investopedia.com Downloaded Dec. 18, 2005.

"What is Arbitrage?", www.economics.about.com Downloaded Dec. 18, 2005.

"Sportsbook Arbitrage," www.homepokergames.com Downloaded Dec. 18, 2005.

"Sports Betting Arbitrage," www.uk-wholesaler.co.uk Downloaded Dec. 18, 2005.

"Arbitrage Sports Betting and Trading Services," www.ucantlose.co.uk Downloaded Dec. 18, 2005.

Regolamento, "Bet Exchange" (Jan. 13, 2000) (posted to newsgroup it.hobby.totoscommesse).

Mitchell Lavnick and Pat Sandberg, Leaving Las Vegas Behind, Internet Underground, Issue 8, (Jul. 1996) (available at http://underground-online.troybrophy.com/iu/archive/issue8/gambling/).

George Johansson, "Pokerproffs startat spelbörs," Dagens Industrial (Mar. 13, 1995).

"Broker Concept Pays Off at BET-EX" www.betex.com/aboutus/article.htm (archived Jan. 25, 1998).

Declaration of Jan Lundberg (signed Jul. 7, 2010).

Reexamination Request filed Oct. 26, 2010 for Reexamination Serial No. 95/000,561.

* cited by examiner

Total Selections (4) GBP 105% Back Lay 94%

| | | | | | | |
|---|---|---|---|---|---|---|
| Hand 1 | | 1.4 £1000 | 1.6 £788 | 1.65 £2 | 1.68 £240 | 1.69 £100 |
| Hand 2 | 2.3 £195 | 2.42 £240 | 3 £100 | 3.25 £50 | 3.3 £85 | 3.5 £70 |
| Hand 3 | 9 £30 | 13 £20 | 15 £54 | 18.5 £7 | 20 £120 | |
| Hand 4 | 22 £50 | 30 £5 | 3.95 £5 | 4.1 £5 | 80 £120 | |

Total Selections (4) GBP 100% Back Lay 94%

| | | | Back | Lay | | |
|---|---|---|---|---|---|---|
| Hand 1 | | 1.4<br>£1000 | 1.6<br>£788 | 1.65<br>£2 | 1.68<br>£240 | 1.69<br>£100 |
| Hand 2 | 2.3<br>£195 | 2.42<br>£240 | 3<br>£100 | 3.25<br>£50 | 3.3<br>£85 | 3.5<br>£70 |
| Hand 3 | 9<br>£30 | 13<br>£20 | 15<br>£54 | 18.5<br>£7 | 20<br>£120 | |
| Hand 4 | 22<br>£50 | 30<br>£5 | 3.95<br>£5 | 4.1<br>£5 | 80<br>£120 | |

BETTING ON GAMES USING A BETTING EXCHANGE SYSTEM

FIELD OF THE INVENTION

The present invention relates to computer systems for permitting betting over a communications network such as the Internet.

BACKGROUND

Betting exchange systems have become very popular in recent years. They permit users of client terminals such as personal computers to access a central server over the Internet and place bets on a variety of events. The bets that can be placed are bets either backing an outcome of an event or laying the outcome. For example, in a horse racing event, a user can either back one or more of the horses or can place a single bet laying a particular horse, meaning that he is betting that the horse will not win. Betting exchange systems permit replacement of the traditional bookmaker, so that users are effectively betting against one another.

Online games have also been growing in popularity, with games such as poker widely available over the Internet, and players playing against one another.

SUMMARY OF THE INVENTION

The present invention aims to combine an online game with a betting exchange system.

According to the present invention, there is provided a method of betting on a game using a betting exchange system, the system permitting a plurality of users to submit bet requests relating to the game over a communications network, wherein the game comprises a plurality of rounds, each round having a plurality of positions, the method comprising displaying the positions for each of the rounds to the users for a predetermined time, accepting bet requests during one or more of the rounds, the bet requests comprising bets backing a position and bets laying a position, providing a game transition between each round, the game transition affecting each of the positions and evaluating each of the positions after one or more of the transitions to determine if a position is a winning position or a losing position.

The method may comprise refusing to accept bet requests during any round in respect of a position that is guaranteed to win or lose.

The step of evaluating each of the positions may comprise generating a set of all possible outcomes for an incomplete position and comparing the best outcome for the position to the best outcome for each of the other positions.

The game may comprise a variety of poker and each position may correspond to a hand comprising a plurality of cards, and each game transition comprises a change in the number of cards visible to users of the betting exchange system.

A first round comprises a round in which cards are dealt for each hand, but none of the cards are visible to users. A second round may comprise a round in which one or more hole cards for each hand are visible to all of the users. Further rounds may comprise rounds in which one or more cards are visible to users, said cards comprising community cards that are available to each of the plurality of hands to make a winning combination.

The variety of poker may comprise Texas Holdem, wherein the first round comprises a deal round, a second round comprises a preflop round, comprising the face up display of two hole cards for each hand, a third round comprises a flop round, in which three community cards are displayed face up, a fourth round comprises a turn round, in which a further community card is displayed face up and a fifth round comprises a river round in which a final community card is displayed face up.

The predetermined time may comprise a betting window during which the users are permitted to submit bet requests.

The betting exchange system may run on a server and each of the user may access the system from respective client terminals, and the method may further comprise maintaining, at the client terminal, a client record of the cards that are visible to a user, transmitting said client record to the server with a submitted bet request, comparing said client record with a server record of the cards that are visible to the user and in the event of a mismatch, rejecting said submitted bet request.

According to the invention, there is further provided a betting exchange system for betting on a game, the system comprising a server for receiving bet requests relating to the game from a plurality of users over a communications network, wherein the game comprises a plurality of rounds, each round having a plurality of positions, the system being configured to display the positions for each of the rounds to the users for a predetermined time, accept bet requests during one or more of the rounds, the bet requests comprising bets backing a position and bets laying a position, provide a game transition between each round, the game transition affecting each of the positions and evaluate each of the positions after one or more of the transitions to determine if a position is a winning position or a losing position.

According to the invention, there is further provided a method of synchronising a betting exchange system running on a server with a client terminal that accesses the server over a communications network, the system permitting a plurality of users to submit bet requests relating to a card game based on a display of cards that are visible to each of the plurality of users, the method comprising maintaining, at the client terminal, a client record of the cards that are visible to a user of the terminal, transmitting said client record to the server with a submitted bet request, comparing said client record with a server record of the cards that are visible to the user and in the event of a mismatch, rejecting said submitted bet request.

According to the invention, there is still further provided a method of configuring a variety of poker for use in a method of betting on a game using a betting exchange system, the method comprising determining a number of rounds over which the game is to be played, determining a number of hands of cards that are to participate in the game, determining a number of hole cards that are associated with a particular hand, determining a number of community cards that will be available to each hand, determining the number of community cards that will be revealed during each round and determining rules for evaluating each of the hands.

The number of community cards may be selected to be between 2 and 6, the number of hole cards may be selected to be between 2 and 5 and the number of hands may be selected to be between 2 and 4.

BRIEF DESCRIPTION OF THE DRAWINGS

Embodiments of the invention will now be described by way of example, with reference to the accompanying drawings, in which.

DETAILED DESCRIPTION OF THE INVENTION

The present invention builds on the innovation of a prior invention submitted by the owner as U.S. patent application Ser. No. 09/959,975 ("Betting Exchange System"), derived from PCT application no. PCT/GB01/01141 filed on 15 Mar. 2001, the contents of which are incorporated herein by reference. That application describes the operation of a betting exchange system, in particular the way in which bet requests are received from a plurality of users both backing and laying outcomes, and the way in which those bet requests are matched, or aggregated for display to the users.

Figure 1:
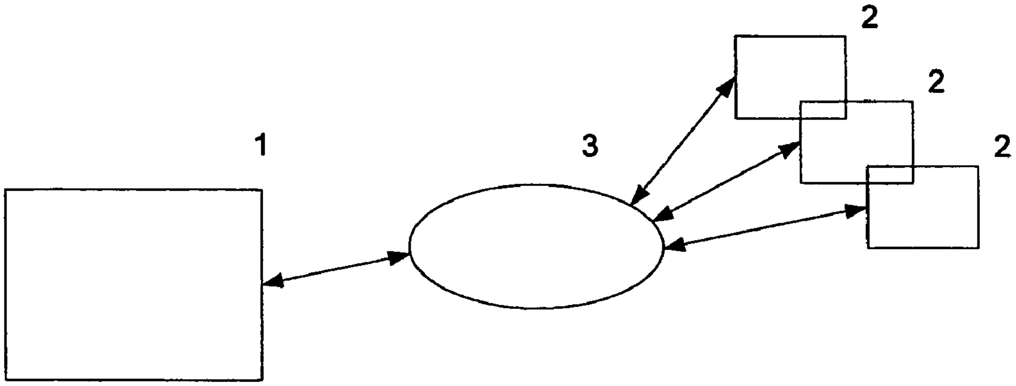
FIG. 1 illustrates a betting exchange system according to the invention.

FIG. 1 illustrates a system according to the invention, comprising a server 1 for providing betting exchange functionality and for running a game, and a plurality of client terminals 2 connected to the server 1 over a communications network such as the Internet 3.

The invention will be illustrated by reference to a type, or variety, of poker referred to as Texas Holdem.

When a user wishes to bet on a poker game, he or she logs into the system. It is assumed that all of the steps of registering with the system, checking that the user meets any age or location specific requirements and that the user has sufficient funds in their account, are carried out in a conventional way. The betting need not be carried out for financial value, but may be carried out for fun, using tokens or in any other suitable manner.

Each game is based on a number of rounds, which together make up a game session, which is, for example, limited to a particular duration. Each round has a betting window during which betting is permitted. Betting is suspended at the end of a betting window, immediately before a transition between rounds, for example, when one or more cards are revealed to the plurality of users. All unmatched bets are cancelled at the end of the betting window. It will be understood that references to displaying cards, revealing cards or making cards visible means displaying these cards face up, so that the value of the cards can be seen by users that are logged onto the system.

Figure 2:
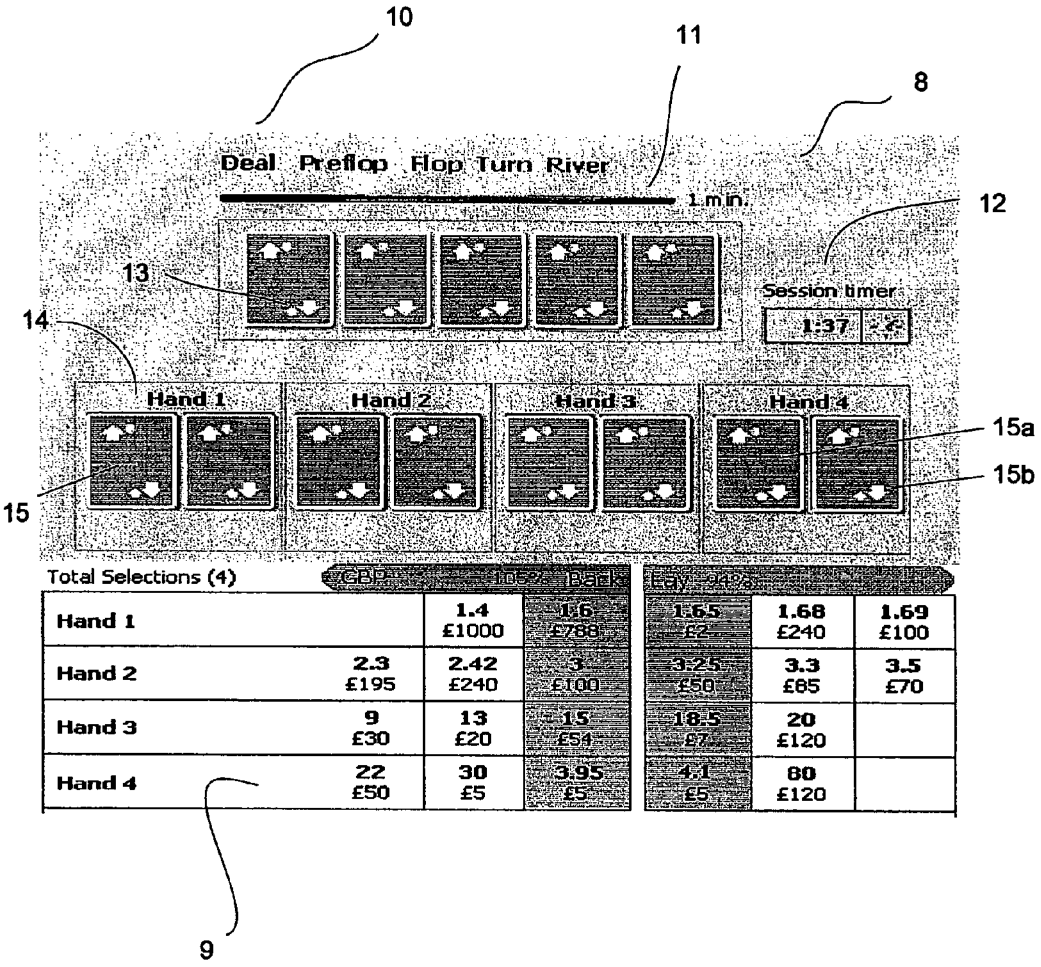
FIG. 2 is a screenshot illustrating a display of a first round of a game of Texas Holdem poker, showing a card display part and a betting part.

FIG. 2 illustrates an example screenshot for a first round of Texas Holdem poker, referred to as the 'Deal' round. The screenshot is essentially divided into two parts, a card display part 8 and a betting part 9. The card display part 8 illustrates a total of thirteen cards, all face down. The round name 10 is shown at the top of the screen above a progress bar 11 that shows how much of the round has elapsed. A total session timer 12 is also shown.

Five cards 13 are shown below the progress bar. These are referred to as community cards, since they can be used by all players to form their best hand. Four hands 14 are shown below the community cards. Each hand comprises two cards 15*a*, 15*b*, generally referred to as hole cards 15, which are cards dealt to a particular player and not shared amongst other players.

The betting part 9 displays the current bets placed by users in respect of each of the hands. For example, the display is in the form currently used by the owner of the present application on its Betfair™ website. The display comprises a number of cells for each hand, each cell illustrating a price (odds) and a size (amount) available to back and lay a particular hand. The best price and size for each of backing and laying a hand is shown in the shaded columns closest to the centre of the display. For example, Hand 2 is available to be backed at digital odds of 3 up to an amount of £100, while the next best odds are 2.42 up to an amount of £240. So a user wishing to back Hand 2 for £10 at odds of 3 would submit this bet request to the server from his client terminal, and in the absence of any other bets, the display would be updated to show that only £90 is now available at odds of 3.

It will be appreciated that the figures shown in the cells are by way of illustration only and do not reflect realistic figures that would appear in a live game.

In accordance with the previous application referred to above, the betting exchange system permits users to submit their own bets, at a user specified price and size, if the bet that they wish to place is not available on the system. Such bets submitted by all users will be aggregated and re-displayed, for other users to accept.

It is possible that, as a result of conditions such as varying connection speeds, system delays and so on, the display being viewed by a user is not up to date or a bet submitted by a user is being processed after a subsequent game transaction. To prevent a user submitting a bet request based on incorrect information, the client terminal 2 logs the number of cards that are visible to the user and submits this information with the bet request. On processing of the bet request, the server 1 compares the number of visible cards with its own record of the number of cards that are currently visible to the user. In the event of a mismatch, the bet request is rejected and the user is informed accordingly.

Figure 3:
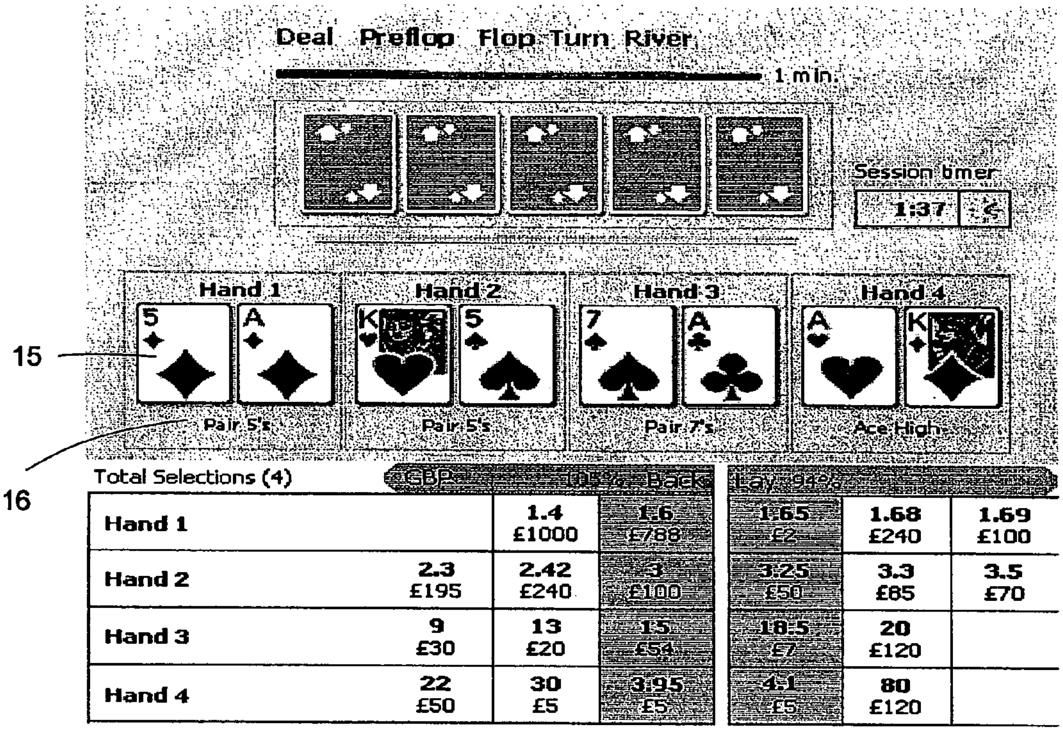
FIG. 3 is a screenshot illustrating a display of a second round of a game of Texas Holdem poker.

FIG. 3 is a screenshot illustrating a next round, referred to herein as the 'Preflop' round. In this round, all of the hole cards 15 are visible and another round of betting is enabled.

Brief descriptions may also appear under each hand, describing the best hand currently held by the player. The hand currently held by any player is also referred to herein as a position.

Figure 4:
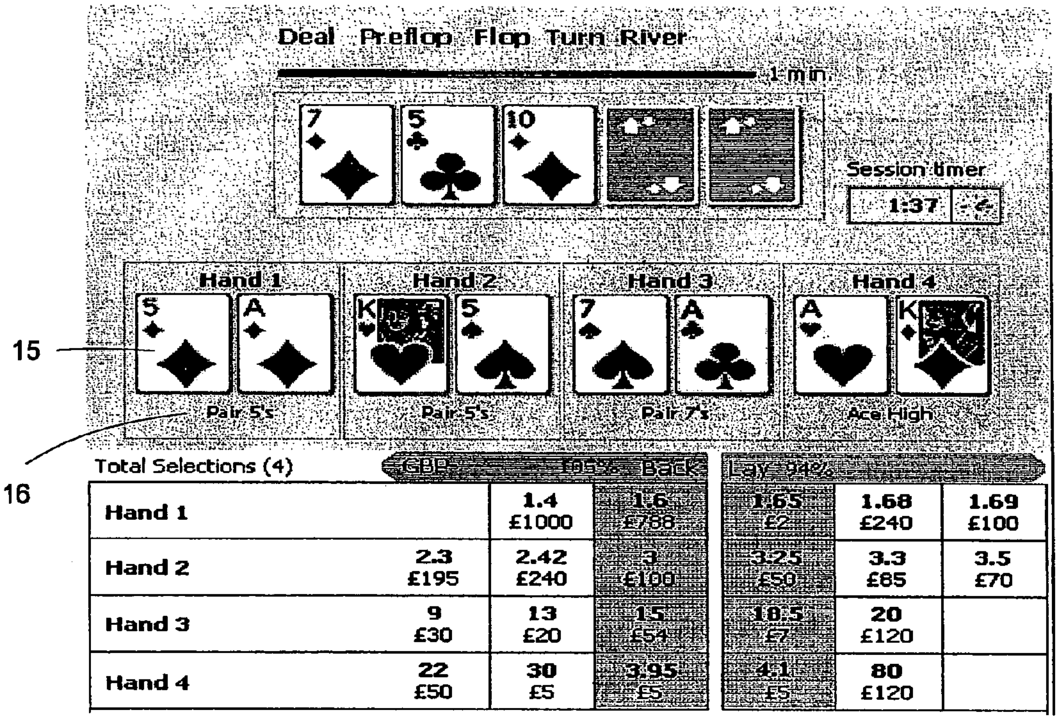
FIG. 4 is a screenshot illustrating a display of a third round of a game of Texas Holdem poker.

FIG. 4 illustrates a further round, referred to as the 'Flop' round. In Texas Holdem, the flop round results in three community cards being revealed. A further round of betting ensues.

Figure 5:
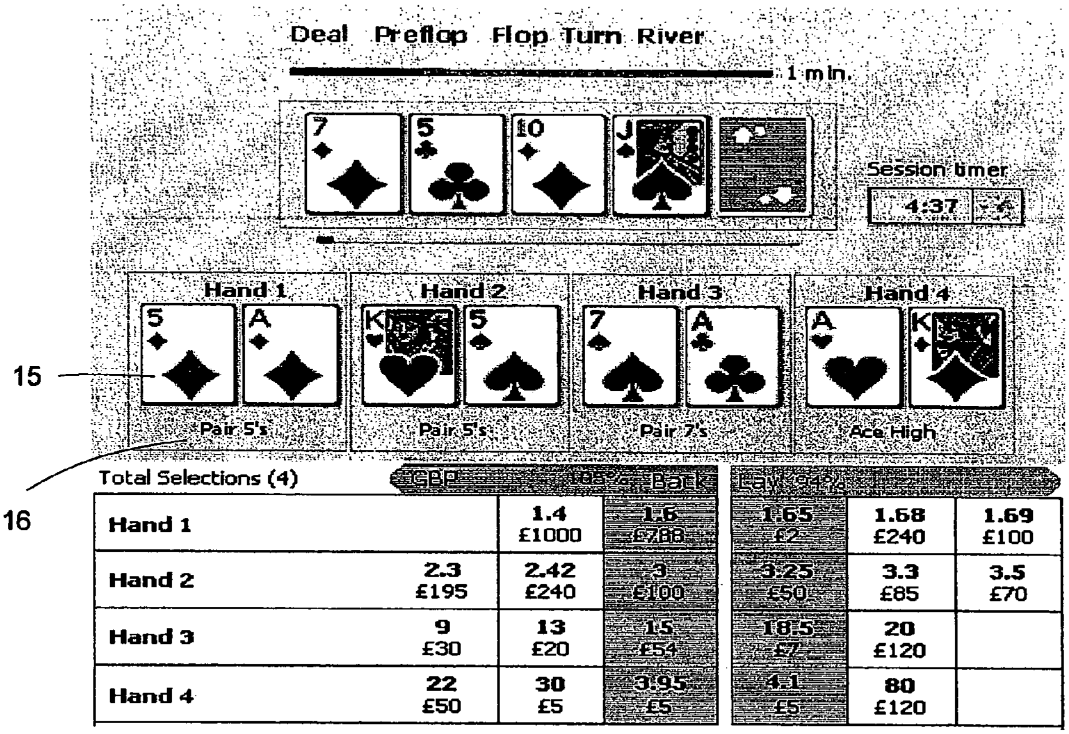
FIG. 5 is a screenshot illustrating a display of a fourth round of a game of Texas Holdem poker.

FIG. 5 illustrates a further round, referred to as the 'Turn' round. In Texas Holdem, the turn round results in a further single community card being revealed. A final round of betting ensues.

Figure 6:
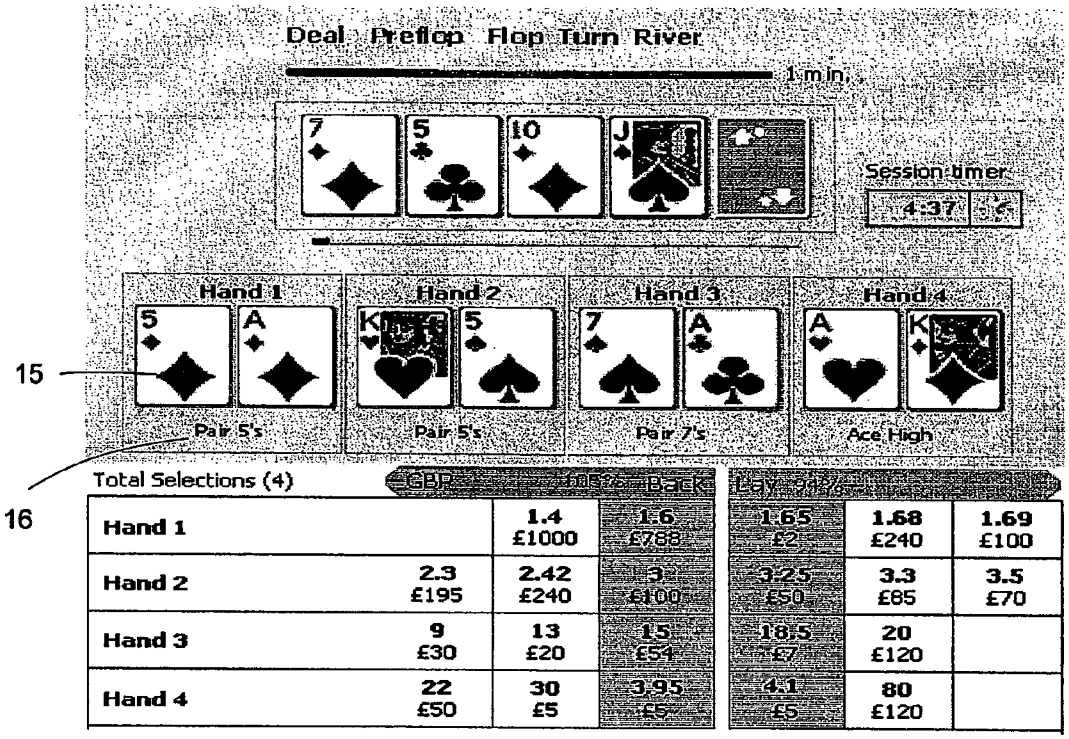
FIG. 6 is a screenshot illustrating a display of a final round of a game of Texas Holdem poker.

FIG. 6 illustrates a final round, referred to as the 'River' round. In Texas Holdem, the river round results in one final community card being revealed. The winning hand or hands are revealed during the last round, so that betting is not permitted at this stage.

Figure 7:
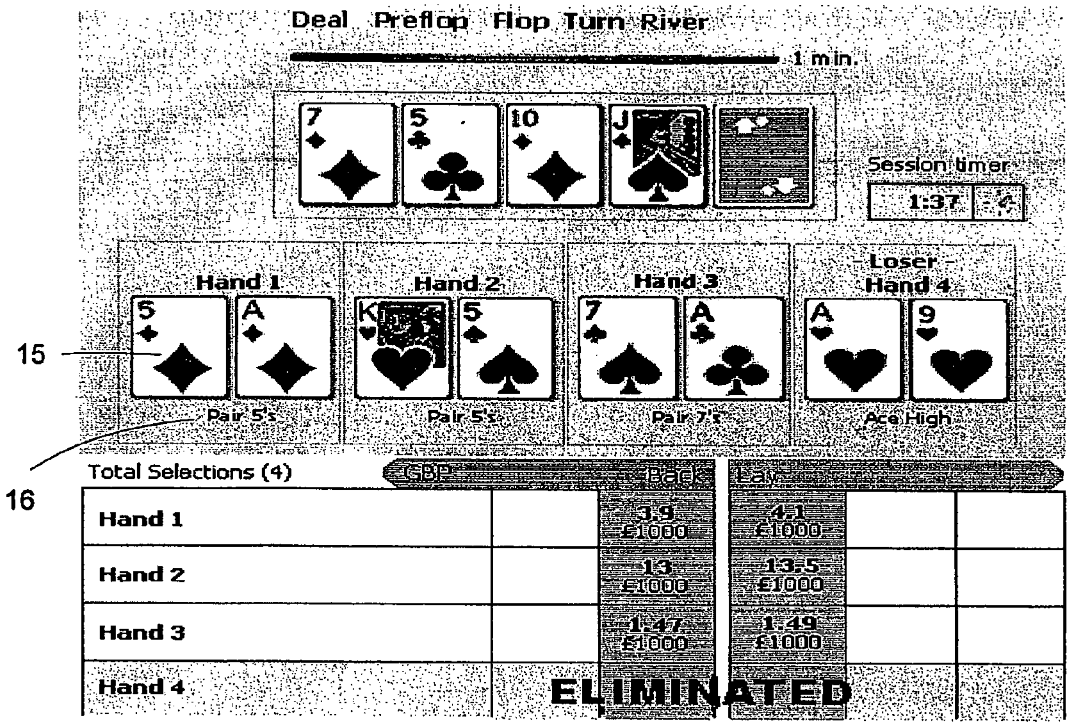
FIG. 7 is a screenshot illustrating elimination of one hand.

It is possible for winning hands or losing hands to be revealed earlier in the game. An enumerator program running at the server generates all possible outcomes for an incomplete hand. A guaranteed losing hand is identified prior to the start of a betting window and further betting on the hand is prevented. For example, FIG. 7 illustrates a screenshot showing a hand that has been eliminated during the Turn round. Betting on the other hands continues to be permitted.

In the event that there can be only one winner, either one hand or a dead heat between two or more hands, the game is suspended and proceeds to settlement.

Figure 8:
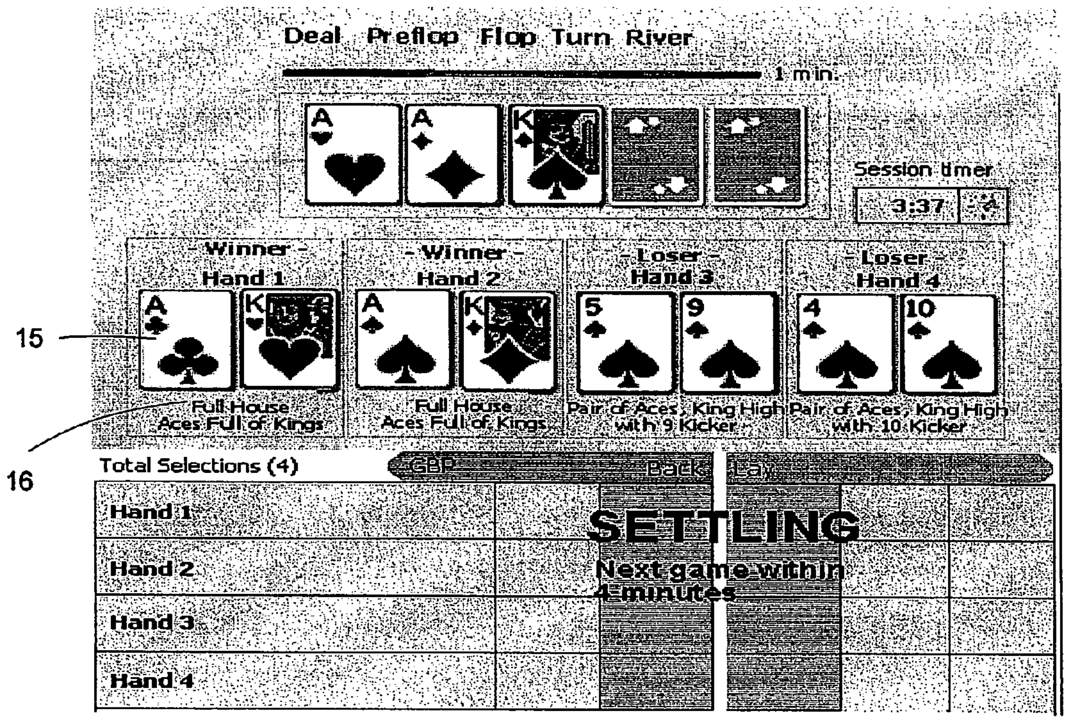
FIG. 8 is a screenshot illustrating settlement after the flop round.

This may occur during an early round. For example, FIG. 8 shows a view where two hands are guaranteed winners and two hands are losers on the Flop round. At this point, the bets proceed to settlement immediately, where the accounts of winning users are credited and the accounts of losing users debited.

Evaluation of each hand is done during every round and follows the normal rules of the game in question, or in another example follows rules as preset by the system operator. For example, in evaluating a hand, evaluation can be based on both hole cards and three community cards, on one hole card and four community cards, or on all five community cards.

While Texas Holdem is one variety of poker, there are many poker varieties. It is also envisaged that previously unknown varieties of poker could be specifically configured. For example, a game of poker can be configured based on the following variables:

| Attribute | Description |
|---|---|
| Community cards | 2-6 community cards |
| Hand evaluation | The rules by which hands are evaluated |
| Hands | 2-4 hands |
| Hole cards | 2-5 hole cards |
| Rounds | The number of rounds and the number of community cards revealed per round |

For example, Texas Holdem falls into this group by having 5 community cards, its own evaluation rules, 4 hands, 2 hole cards and a round structure of 3-1-1, in which 3 community cards are revealed in a first round, 1 in the next and 1 in the final round.

While the above invention is described in relation to Texas Holdem poker, the invention is not limited to this variety of poker, nor indeed is it limited to poker or only other card games. Betting on any game that falls within the scope of the appended claims is covered. Modifications to the embodiments described above falling within the spirit and scope of the invention would be apparent to the skilled person.

The invention claimed is:

1. A method of betting on a game using a betting exchange system, the system permitting a plurality of users to submit, through terminals, bet requests relating to the game over a communications network to a server, wherein the game comprises a plurality of rounds, each round having a plurality of positions, the method comprising:

displaying, on the terminals, the positions for each of the rounds to the users for a predetermined time, wherein all the positions are displayed on each terminal to thereby display each position to all the users;

accepting bet requests for the positions during one or more of the rounds for which client records, maintained on the terminals and transmitted to the server through the communications network with the bet requests, of positions that are displayed on the terminals match a server record of positions that are displayed on the terminals and rejecting any bet requests in which there is not a match, the bet requests comprising bets backing a respective position of the positions from any of the users and bets laying a respective position of the positions from any of the users;

providing a game transition between each round, the game transition affecting each of the positions; and evaluating each of the positions after one or more of the transitions to determine if a position is a winning position or a losing position.

2. A method according to claim 1, comprising refusing to accept bet requests during any round for a respective position that is guaranteed to win or lose.

3. A method according to claim 1, wherein evaluating each of the positions comprises generating a set of all possible outcomes for an incomplete position and comparing the best outcome for the incomplete position to the best outcome for each of the other positions.

4. A method according to claim 1, wherein the game comprises a variety of poker and each position corresponds to a hand comprising a plurality of cards, and each game transition comprises a change in the number of cards visible to users of the betting exchange system.

5. A method according to claim 4, wherein a first round comprises a round in which cards are dealt for each hand, but none of the cards are visible to users.

6. A method according to claim 5, wherein a second round comprises a round in which one or more hole cards for each hand are visible to all of the users.

7. A method according to claim 6, wherein further rounds comprise rounds in which one or more cards are revealed to the users, said cards comprising community cards that are available to each of the plurality of hands to make a winning combination.

8. A method according to claim 7, wherein the variety of poker comprises Texas Holdem, wherein the first round comprises a deal round, a second round comprises a preflop round, comprising the face up display of two hole cards for each hand, a third round comprises a flop round, in which three community cards are displayed face up, a fourth round comprises a turn round, in which a further community card is displayed face up and a fifth round comprises a river round in which a final community card is displayed face up.

9. A method according to claim 1, wherein the predetermined time comprises a betting window during which the users are permitted to submit bet requests.

10. A betting exchange system for betting on a game, the system comprising a server for receiving bet requests relating to the game from a plurality of users through terminals over a communications network, wherein the game comprises a plurality of rounds, each round having a plurality of positions, the system being configured to:

display the positions for each of the rounds to the users for a predetermined time on the terminals, wherein each displayed position is displayed on each terminal to thereby display each position to all the users;

accept bet requests during one or more of the rounds for which client records, maintained on the terminals and transmitted to the server through the communications network with the bet requests, of positions that are displayed on the terminals match a server record of positions that are displayed on the terminals and rejects any bet requests in which there is not a match, the bet requests comprising bets backing a respective position of the positions from any of the users and bets laying a respective position of the positions from any of the users;

provide a game transition between each round, the game transition affecting each of the positions; and evaluate each of the positions after one or more of the transitions to determine if a position is a winning position or a losing position.

11. An apparatus comprising:

a server; and a plurality of terminals connected to the server over a communications network, wherein the server causes a plurality of rounds of an online poker game to be played, each round comprising a plurality of hands, and for each round, the server causes the plurality of hands of the round to be displayed on each of the terminals, all visible cards in each hand being displayed on each of the terminals to users of the terminals, for each hand, the server causes a price or odds, along with a size or amount, available as bets for the users to back the respective hand to be displayed on each of the terminals, and causes a price or odds, along with a size or amount, available as bets for the users to lay the respective hand to be displayed on each of the terminals, wherein the displayed available bets are aggregations of available bets made by the users, the server accepts bet requests on the hands made by the users through the terminals for which client records, maintained on the terminals and transmitted to the server over the communication network with the bet requests, of cards that are visible to users of the terminals match server records of cards that are visible to users of the terminals and rejects any bet requests in which there is not a match, any user being able to make a bet request on any of hands, the bet requests including bets backing a respective hand of the plurality of hands and bets laying a respective hand of the plurality of hands, the server matches the bets included in accepted bet requests with the available bets, and updates the displayed available bets based on the matched bets to allow for additional bets included in bet requests to be accepted and matched with the updated displayed available bets, and after the bet matching and the round is played, the server evaluates each of the hands and displays results of the evaluation on each of the terminals; and after a last round of the plurality of rounds is played, the server causes accounts of the users to be settled in accordance with the matched bets and the evaluation by the server after the last round.

12. An apparatus as in claim 11, wherein the displayed available bets include, for each hand, a best price at which to back the respective hand and a best price at which to lay the respective hand.

* * * * *